(12) United States Patent
Miyazaki et al.

(10) Patent No.: US 11,312,268 B2
(45) Date of Patent: Apr. 26, 2022

(54) VEHICLE SEAT

(71) Applicant: TS TECH CO., LTD., Saitama (JP)

(72) Inventors: Masayuki Miyazaki, Tochigi (JP); Shigekazu Otake, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 618 days.

(21) Appl. No.: 16/320,509

(22) PCT Filed: Mar. 28, 2017

(86) PCT No.: PCT/JP2017/012585
§ 371 (c)(1),
(2) Date: Jan. 25, 2019

(87) PCT Pub. No.: WO2018/020734
PCT Pub. Date: Feb. 1, 2018

(65) Prior Publication Data
US 2020/0023756 A1 Jan. 23, 2020

(30) Foreign Application Priority Data
Jul. 29, 2016 (JP) .............................. JP2016-150359

(51) Int. Cl.
*B60R 22/22* (2006.01)
*B60N 2/12* (2006.01)
(Continued)

(52) U.S. Cl.
CPC ................. *B60N 2/12* (2013.01); *B60N 2/30* (2013.01); *B60N 2/42* (2013.01); *B60R 22/22* (2013.01);
(Continued)

(58) Field of Classification Search
CPC .... B60N 2/12; B60N 2/06; B60N 2/68; B60R 22/22; B60R 2022/1806; B60R 2022/266
See application file for complete search history.

(56) References Cited

U.S. PATENT DOCUMENTS 5,332,261 A * 7/1994 Siepierski ............... B60R 22/22
280/801.1
5,775,780 A * 7/1998 Murphy ............... B60N 2/0825
297/216.18
(Continued)

FOREIGN PATENT DOCUMENTS

CN 112406776 A * 2/2021
EP 3381753 A1 * 10/2018 ............. B60R 22/18
(Continued)

OTHER PUBLICATIONS

International Search Report for PCT/JP2017/012585 dated Jun. 6, 2017, 2 pages.
(Continued)

*Primary Examiner* — Timothy J Brindley
(74) *Attorney, Agent, or Firm* — Dority & Manning, P.A.

(57) ABSTRACT

Provided is a vehicle seat having a seat back that can be folded forward, in which the buckle is prevented from interfering with the seat back when the seat back is folded forward. A seat cushion frame (F1) rotatably attached to the seat back frame (F2) includes a pair of side frames (11) extending in a fore and aft direction, a front frame (12) extending between front parts of the side frames, and a rear frame (13) extending between rear parts of the side frames and provided with a curved portion (13A) protruding forward in a middle part thereof. A buckle support arm is located behind the curved portion, the curved portion being dimensioned so as not to interfere with the buckle when the buckle support arm is in a stowed position.

12 Claims, 10 Drawing Sheets

(51) Int. Cl.
  *B60N 2/68* (2006.01)
  *B60N 2/30* (2006.01)
  *B60N 2/42* (2006.01)
  *B60N 2/90* (2018.01)
  *B60R 22/26* (2006.01)

(52) U.S. Cl.
  CPC .................. *B60N 2/68* (2013.01); *B60N 2/90* (2018.02); *B60N 2205/35* (2013.01); *B60R 22/26* (2013.01)

(56) References Cited

U.S. PATENT DOCUMENTS

| | | | | |
|---|---|---|---|---|
| 7,229,135 | B2 * | 6/2007 | Hyatt | B60R 22/22 297/481 |
| 8,439,448 | B2 * | 5/2013 | Murthy | B60N 2/688 297/481 |
| 8,459,748 | B2 * | 6/2013 | Jovicevic | B60R 22/26 297/481 |
| 8,628,145 | B2 * | 1/2014 | Parida | B60N 2/3013 297/481 |
| 9,802,570 | B1 * | 10/2017 | Elton | B60R 22/20 |
| 2017/0113575 | A1 * | 4/2017 | Epaud | B60N 2/3011 |
| 2019/0225185 | A1 * | 7/2019 | Ohno | B60N 2/42781 |
| 2019/0291685 | A1 * | 9/2019 | Ohno | B60R 22/023 |
| 2021/0039586 | A1 * | 2/2021 | Morrow | B60R 22/20 |

FOREIGN PATENT DOCUMENTS

| | | | | |
|---|---|---|---|---|
| FR | 3012385 | A1 * | 5/2015 | ........... B60N 2/3065 |
| JP | S56/158352 | | 11/1981 | |
| JP | 3070393 | | 7/2000 | |
| JP | 2004/114792 | | 4/2004 | |
| JP | 2010023793 | | 2/2010 | |
| JP | 2012030742 | | 2/2012 | |
| JP | 2013/136264 | | 7/2013 | |
| KR | 20180113045 | A * | 10/2018 | |
| WO | WO2014192095 | | 12/2014 | |

OTHER PUBLICATIONS

Office Action (w/English translation) for corresponding Japanese Patent Application No. JP 2020-101868, drafted on Mar. 3, 2021—8 pages.

* cited by examiner

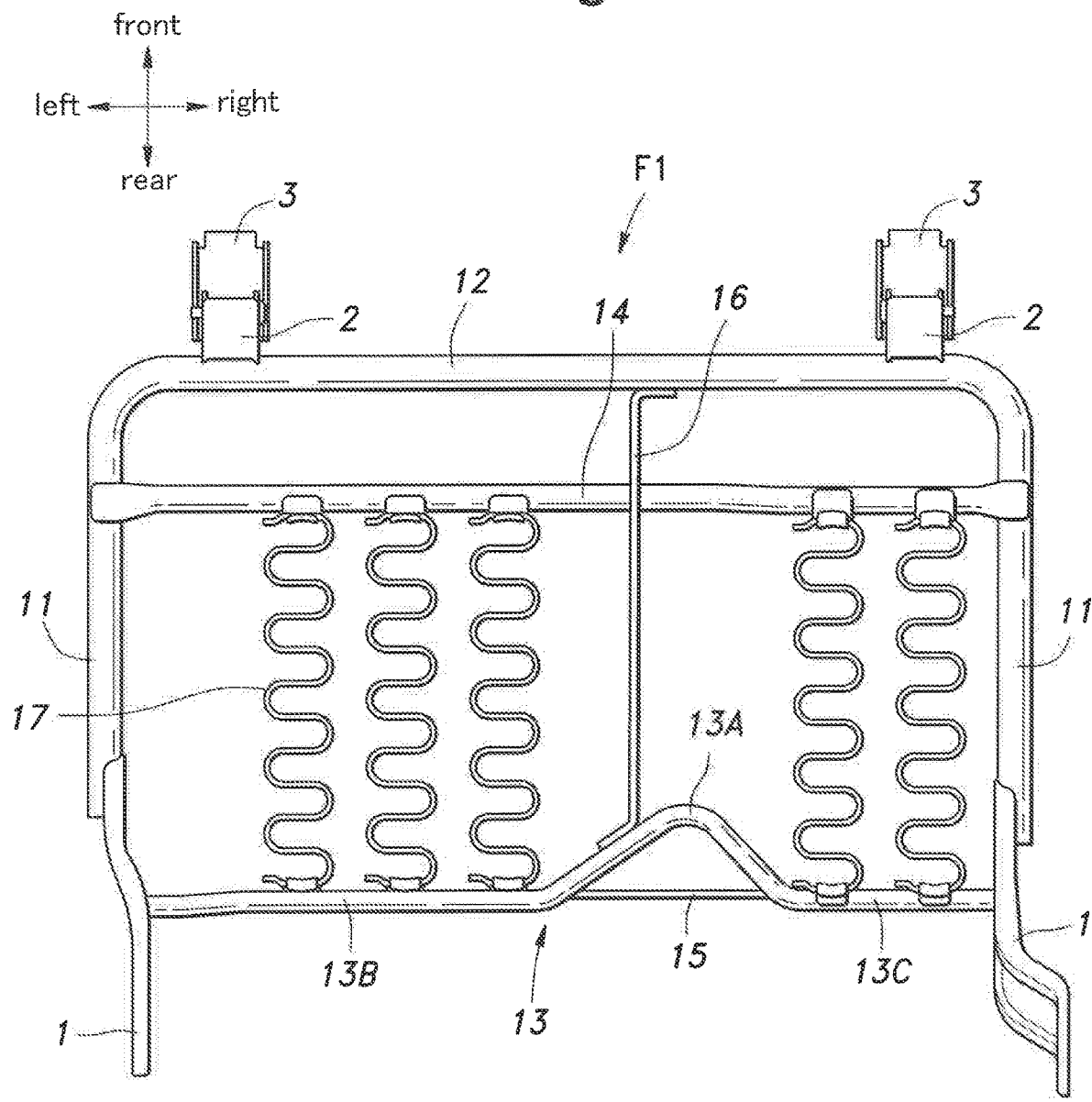

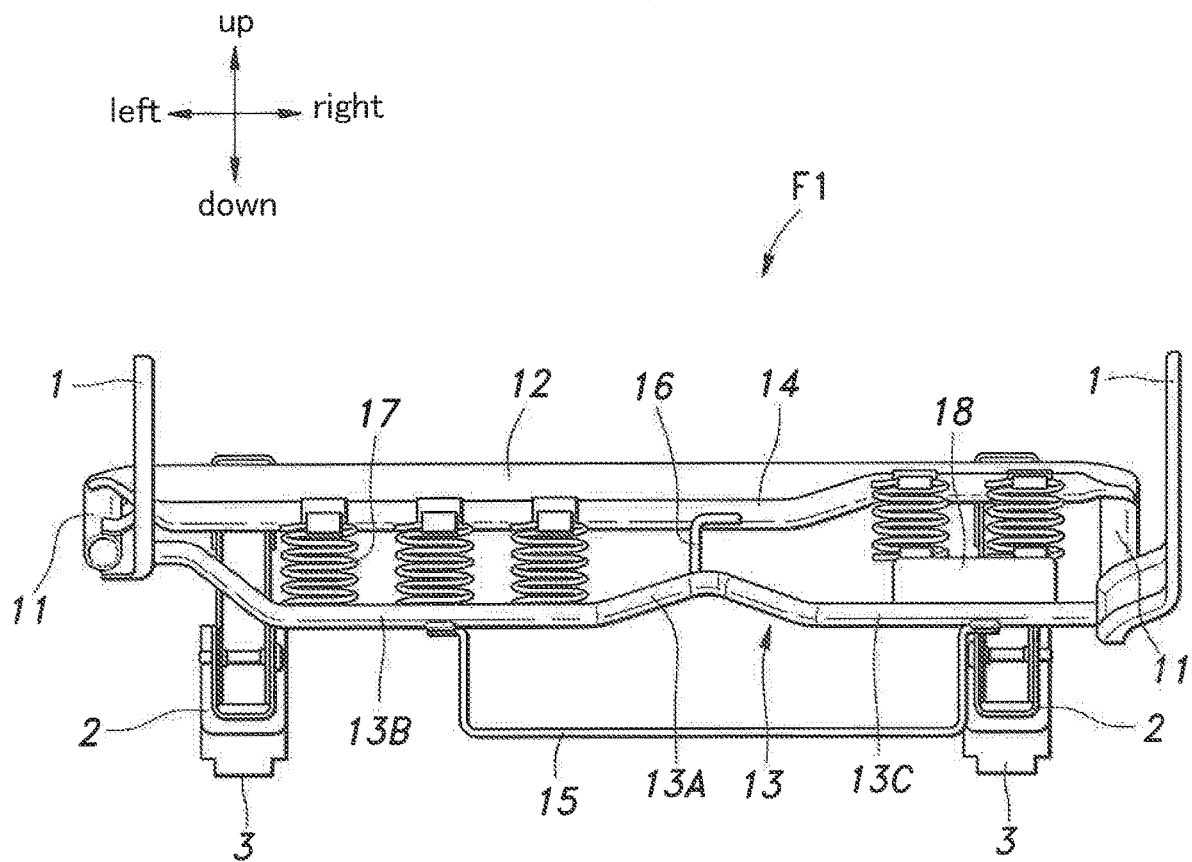

VEHICLE SEAT

CROSS REFERENCE TO RELATED APPLICATIONS

This application is the U.S. National Stage entry of International Application Number PCT/JP2017/012585 filed under the Patent Cooperation Treaty having a filing date of Mar. 28, 2017, which claims priority to Japanese Patent Application No. 2016450359 having a filing date of Jul. 29, 2016, which are incorporated herein by reference.

TECHNICAL FIELD

The present invention relates to a vehicle seat configured to be mourned to a vehicle or the like.

BACKGROUND ART

In a rear seat of a vehicle having a seat cushion configured to seat two passengers, a buckle that can be coupled with a tongue plate of a seat belt is required to be provided in a rear central part of the seat cushion. In such a rear seat, it is known to provide a recess in a laterally extending frame portion positioned behind the seat cushion by curving a central part of the laterally extending frame portion in a forward direction, form a notch in a central part of the rear edge of the seat cushion, and provide an arm connecting a buckle to the floor of the vehicle to extend through the recess and the notch so that the buckle that is passed through the notch is located and exposed above the seat surface of the seat cushion. See Patent Document 1, for instance.

PRIOR ART DOCUMENT(S)

Patent Document(s)

Patent Document 1: JP3070393B

SUMMARY OF THE INVENTION

Task to be Accomplished by the Invention

However, the vehicle seat disclosed in Patent Document 1 is configured in such a manner that the buckle is always maintained above the seat surface of the seat cushion so the buckle prevents the seat back from being folded forward.

In view of such a problem of the prior art, a primary object of the present invention is to provide a vehicle seat having a seat back that can be folded forward, and prevent the buckle from interfering with the seat back when folding the seat back forward.

To achieve such an object, one embodiment of the present invention provides a vehicle seat, comprising: a seat back frame (F2) attached to a floor (FL) so as to be rotatable in a fore and aft direction within a prescribed range; a seat cushion frame (F1) rotatably attached to the seat back frame, and configured to move forward when the seat back frame is tilted forward; and a buckle support arm (44) having a base end attached to the floor so as to be rotatable in the fore and aft direction, and a free end fitted with a buckle (45) configured to be coupled with a tongue plate of a seat belt, the buckle support arm being rotatable between a use position where the buckle is positioned above the base end of the buckle support arm, and a stowed position where the buckle is positioned more forward than in the use position; wherein the seat cushion frame includes a pair of side frames located on either side and extending in the fore and aft direction, a front frame (12) extending between front parts of the side frames, and a rear frame (13) extending between rear parts of the side frames and provided with a curved portion (13A) protruding forward in a laterally middle part thereof, and wherein the buckle support arm is located behind the curved portion, the curved portion being dimensioned so as not to interfere with the buckle when the buckle support arm is in the stowed position.

Since the curved portion is dimensioned so as not to interfere with the buckle when the buckle support arm is in the stowed position, the buckle support arm can be positioned in the stowed position such that the buckle does not interfere with the seat back when the seat back is folded forward.

Preferably, in this embodiment, the curved portion is positioned in a rotational locus of the buckle support arm and the buckle when the seat cushion frame is positioned in a rearmost position in correspondence to a position of the seat back frame, and out of the rotational locus of the buckle support arm and the buckle when the seat cushion frame is positioned in a more forward position in correspondence to the position of the seat hack frame.

As the seat back frame rotates forward and the seat cushion frame moves forward, the buckle support arm moves to the stowed position. In particular, as the seat back tilts forward, the buckle support arm moves to the stowed position so that an interference between the buckle and the seat back can be avoided.

According to a preferred embodiment of the present invention, the vehicle seat further comprises a seat cushion pad (34) supported by the seat cushion frame, and provided with a recessed portion (34A) recessed forward from a part of a rear edge of the seat cushion frame corresponding to the curved portion, and the buckle support arm is positioned in the recessed portion in such a manner that the seat cushion pad is positioned in the rotational locus of the buckle support arm and the buckle when the seat cushion frame is positioned in the rearmost position in correspondence to the position of the seat back frame, and out of the rotational locus of the buckle support arm and the buckle when the seat cushion frame is positioned in a more forward position in correspondence to the position of the seat back frame.

Thereby, the size of the recessed portion of the seat cushion pad can be minimized so that the seat surface area of the seat cushion can be maximized.

Preferably, in any of the foregoing embodiments, an upper end of the buckle is lower than an upper surface of the seat cushion pad in the stowed position.

Thereby, when the seat back is folded forward, the buckle in the stowed position is prevented from interfering with the seat back.

Preferably, in any of the foregoing embodiments, the vehicle seat further comprises a biasing device (47) for urging the buckle support arm toward the use position.

Thereby, when the vehicle seat is in the use position, the buckle support arm is urged toward the use position by the biasing device.

Preferably, in any of the foregoing embodiments, the vehicle seat further comprises a reinforcing member (16) extending in the fore and aft direction between the curved portion and the front frame.

Thereby, the stiffness of the seat cushion frame is maintained even when the rear frame is provided with the curved portion.

Preferably, in any of the foregoing embodiments, the vehicle seat further comprises an intermediate frame (14)

extending laterally between the side frames intermediately between the front frame and the rear frame, and a reinforcing member (16) extending in the fore and aft direction between the curved portion and the intermediate frame.

According to this arrangement, the intermediate frame effectively increases the stiffness of the seat cushion frame. Even though the rear frame is provided with the curved portion, the stiffness of the seat cushion frame is maintained by the reinforcing member.

Preferably, in any of the foregoing embodiments, the rear frame includes a left portion (13B) and a right portion (13C) extending laterally on either side of the curved portion, and the seat cushion frame defines a pair of seating parts, the left portion forming a rear part of one of the seating parts, the right portion forming a rear part of the other of the seating parts, and the curved portion is positioned at a boundary between the two seating parts.

Since the curved portion is positioned away from the buttocks of the occupants of the two seating parts of the seat configured to seat two occupants, the occupants are prevented from experiencing any discomfort which could be otherwise caused by the curved portion.

Preferably, in any of the foregoing embodiments, the curved portion, the left portion, and the right portion are formed by a continuous pipe member.

Thereby, the rear frame has a simple structure.

Preferably, in any of the foregoing embodiments, the left portion and the right portion are vertically offset from each other.

Thereby, the thickness of the seat cushion pad for a part of the seat cushion located in a part of the rear frame which is downwardly offset can be increased.

Preferably, in any of the foregoing embodiments, the seat cushion frame forms two seating parts in a rear seating arrangement including a left seating part (31), a middle seating part (32), and a right seating part (3) that are arranged laterally, the two seating parts being formed by one of the left and right seating parts, and the middle seating part, and one of the left portion and the right portion corresponding to the left seating part or the right seating part is offset downward relative to the other of the left portion and the right portion corresponding to the middle seating part.

Thereby, the thickness of the seat cushion pad in the left seating part or the right seating part, which is used more frequently than the middle seating part can be given with an increased thickness.

Preferably, in any of the foregoing embodiments, the vehicle seat further comprises a rear frame reinforcing member (15) connected to the left portion and the right portion, and curved and/or bent downward in a part thereof corresponding to the curved portion.

Thereby, the rear frame can be reinforced without interfering with the buckle support arm.

Preferably, in any of the foregoing embodiments, the curved portion has a V shaped configuration projecting forward in plan view.

Thereby the structure of the rear frame is simplified and manufacturing thereof is facilitated.

Effect of the Invention

According to the above structure, in the vehicle seat having the seat back that can be tilted forward, the buckle can be prevented from interfering with the seat back when the seat back is tilted forward.

BRIEF DESCRIPTION OF THE DRAWING(S)

FIG. 9 is a plan view showing a seat cushion frame according to a second embodiment of the present invention; and FIG. 10 is a rear view showing a seat cushion frame according to a third embodiment of the present invention.

DESCRIPTION OF THE PREFERRED EMBODIMENT(S)

A vehicle rear seat configured as an automotive rear seat (including a second row seat and a third row seat) according to an embodiment of the present invention is described in the following with reference to the appended drawings. The direction as used in the following description is based on the view point of an occupant seated in the vehicle seat.

First Embodiment

Figure 1:
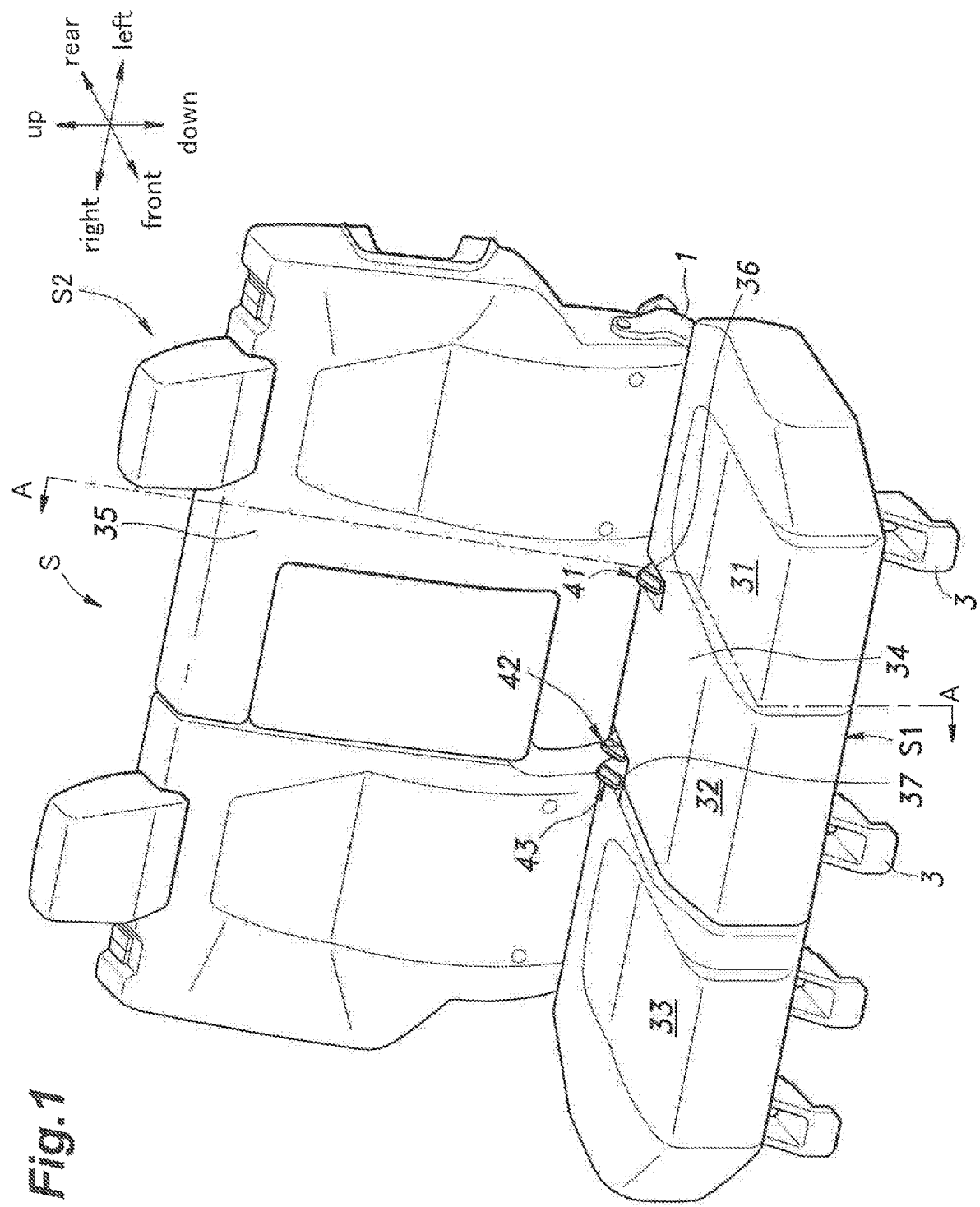
FIG. 1 is a perspective view of a vehicle seat according to a first embodiment of the present invention.
Figure 2:
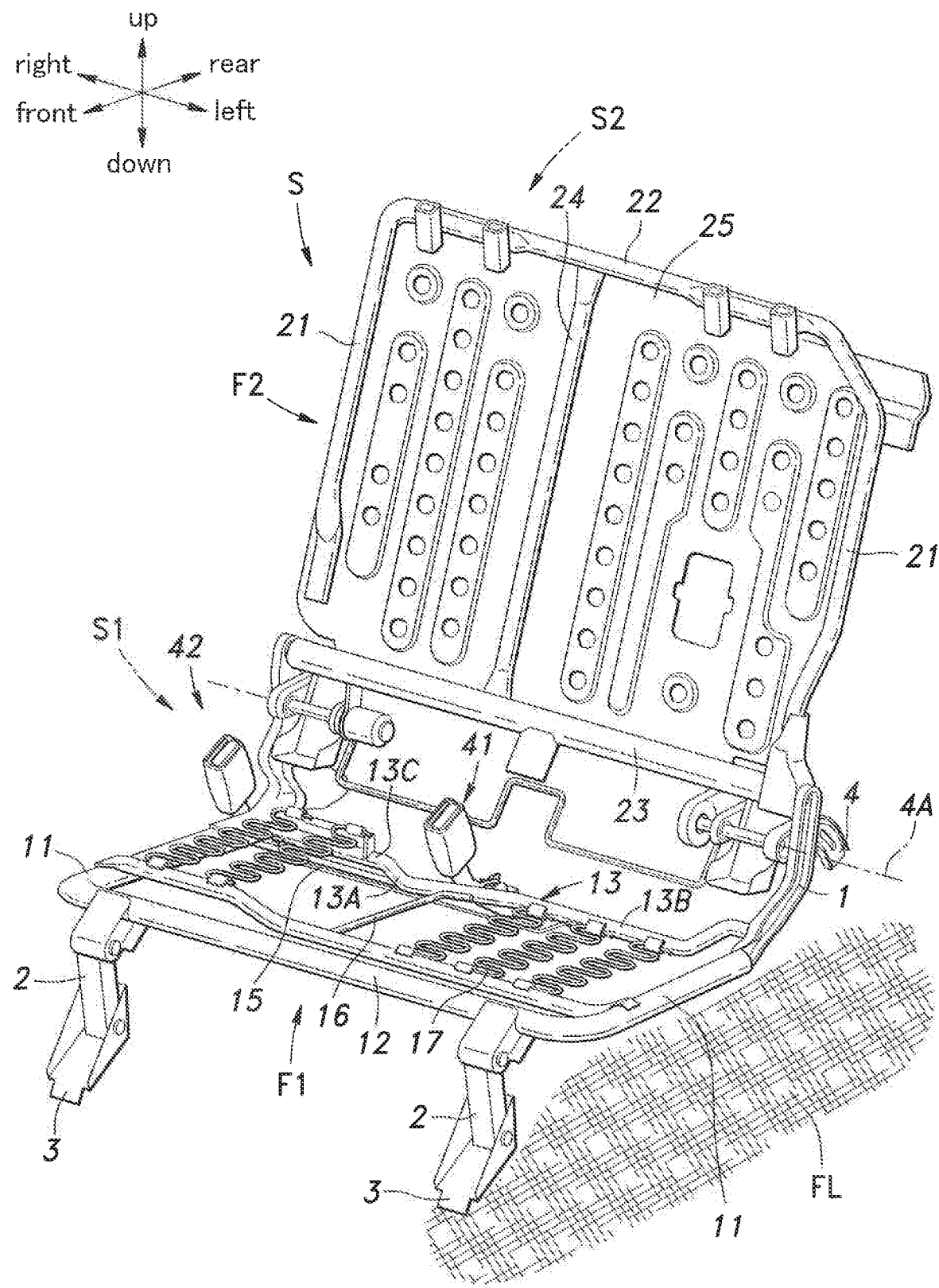
FIG. 2 is a perspective view of a frame of the vehicle seat according to the first embodiment.

As shown in FIG. 1 and FIG. 2, a vehicle seat S includes a seat cushion S1 including a seat cushion frame F1, and a seat back S2 including a seat back frame F2. The lower end of the seat back frame F2 is attached to the rear end of the seat cushion frame F1 so as to be rotatable in the fore and aft direction via a pair of rear links 1. The front end of the seat cushion frame F1 is supported by a pair of front brackets 3 provided on the floor FL via a pair of right and left front links 2, respectively. Each of the front links 2 is supported by the corresponding front bracket 3 so as to be rotatable in the fore and aft direction about an axial line extending laterally, and is rotatably connected to the seat cushion frame F1 about an axial line extending laterally above the earlier said axial line. A lower part of the seat back frame F2 is supported by the rear bracket 4 provided on the floor FL so as to be rotatable in the fore and aft direction about a support axial line 4A extending laterally (see FIG. 5).

By placing a seat cushion pad 34 and a skin member on the seat cushion frame F1, the seat cushion S1 is formed. By attaching the seat back pad 35 and a skin member on the seat back frame F2, the seat back S2 is formed. The seat cushion frame F1 and the seat back frame F2 may be formed by combining metallic members such as metal plate members, pipe members and rod members.

Figure 3:
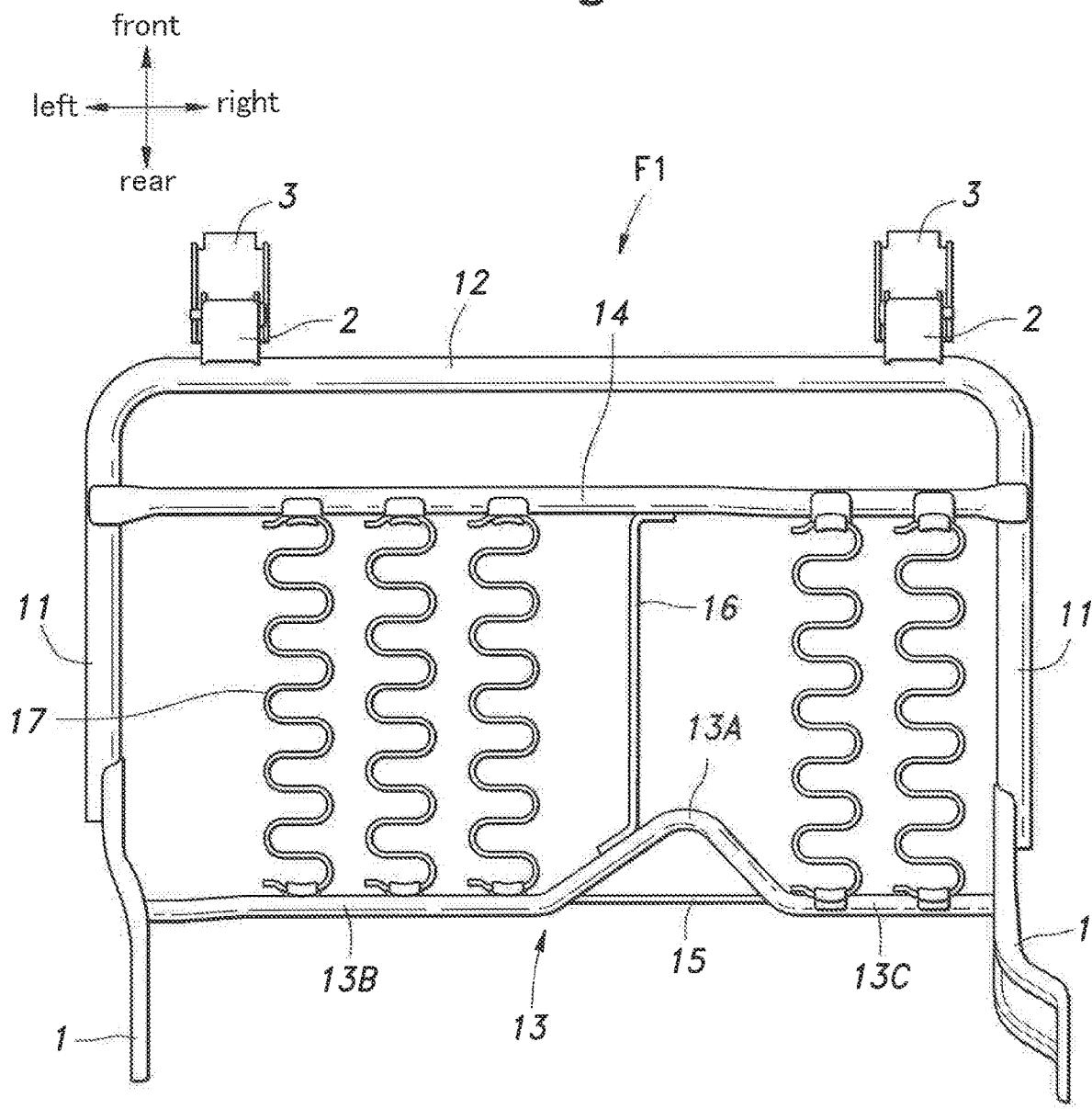
FIG. 3 is a plan view of a seat cushion frame.

As shown in FIG. 3, the seat cushion frame F1 includes a pair of left and right side frames 11 extending in the fore and aft direction, a front frame 12 extending between the front parts of the left and right side frames 11, and a rear frame 13 extending between rear parts of the left and right side frames 11 so as be formed into a rectangular frame shape. The right and left front links 2 are rotatably connected to the front frame 12. The seat cushion frame F1 is further provided with an intermediate frame 14 extending laterally between the left and right side frames intermediately between the front frame 12 and the rear frame 13. The left and right side frames 11 and the front frame 12 are formed by bending a pipe member having a circular cross section. The intermediate frame 14 is formed of a pipe member having a circular cross section.

The rear frame 13 is provided with a curved portion 13A that is bent and/or so as to protrude forward in a laterally intermediate part thereof. Further, the rear frame 13 is provided with a left portion 13B and a right portion 13C extending laterally on either side of the curved portion 13A.

Figure 4:
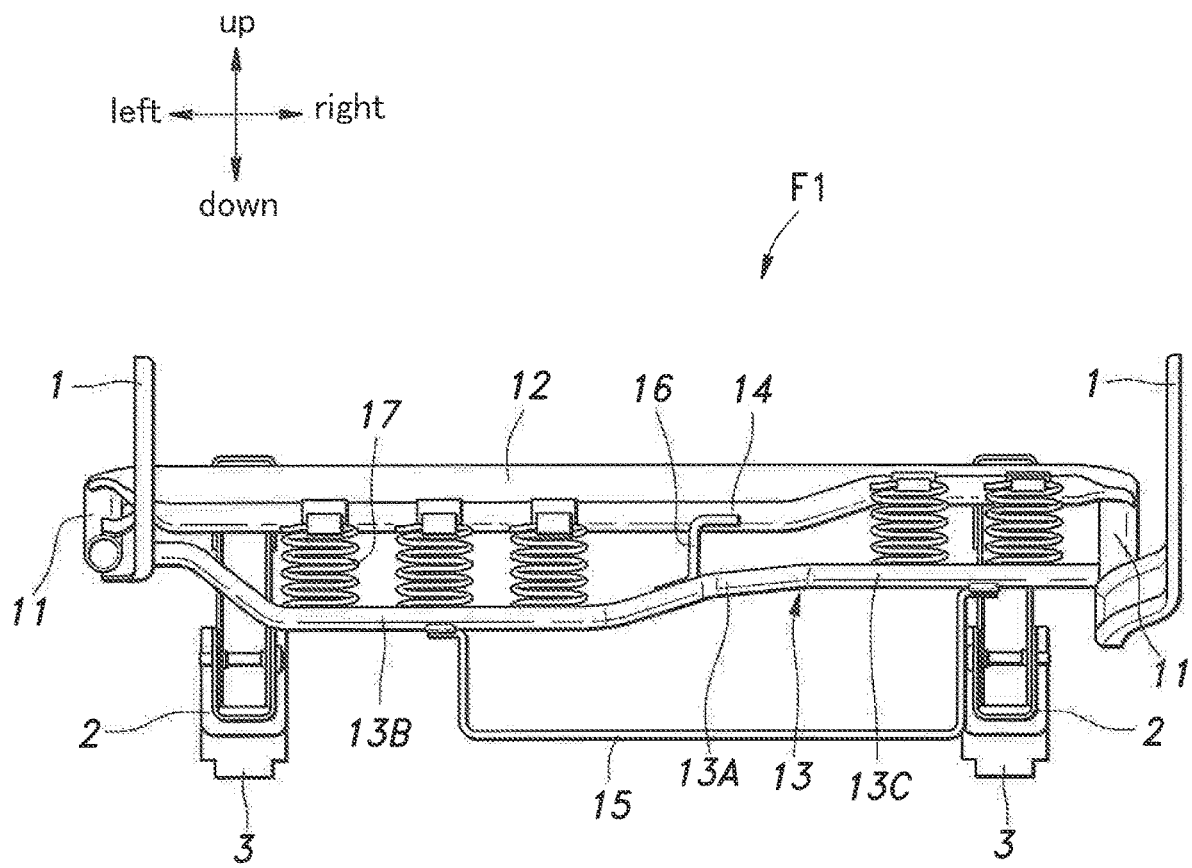
FIG. 4 is a rear view of a seat cushion frame.

The left portion 13B and the right portion 13C are linearly formed. The left end of the left portion 13B is connected to the left side frame 11, and the right end of the right portion 13C is connected to the right side frame 11. As shown in FIG. 4, the left portion 13B and the right portion 13C are vertically offset from each other and in parallel to each other so that the right portion 13C is located higher than the left portion 13B. In the present embodiment, the right side frame 11 is disposed no higher than the left side frame 11 so that the left end part of the left portion 13B is bent upward to be connected to the left side frame 11.

The curved portion 13A is formed in a V shape protruding forward in plan view. The left end of the curved portion 13A is connected to the right end of the left portion 13B, and the right end of the curved portion 13A is connected to the left end of the right portion 13C. As shown in FIG. 4, the curved portion 13A is inclined vertically so as to get progressively higher from the left end to the right end.

The curved portion 13A, the left portion 13B, and the right portion 13C are formed by a single continuous pipe member having a circular cross section, and the curved portion 13A is formed by bending the pipe member. Further, the rear frame 13 is formed of a pipe member having a smaller diameter than the pipe member forming the side frame 11, the front frame 12, and the intermediate frame 14. Further, the rear frame 13 is disposed lower than the front frame 12 and the intermediate frame 14 so as to define a seat surface inclined downward toward the rear so as to get progressively lower from the front end to the rear end.

As shown in FIG. 4, to the rear frame 13 is attached a rear frame reinforcing member 15 extending laterally, and having a left end connected to the left portion 13B and a right end connected to the right portion 13C. The rear frame reinforcing member 15 is shaped in such a manner that a central part 15A thereof corresponding to the curved portion 13A is bent and/or curved downward in a rectangular shape. The rear frame reinforcing member 15 is formed by bending a metal rod, and is joined to the left portion 13B and the right portion 13C of the rear frame 13 by welding.

As shown in FIG. 3, a reinforcing member 16 extends linearly in the fore and aft direction between the curved portion 13A and the intermediate frame 14. The reinforcing member 16 has a front end connected to the intermediate frame 14 and a rear end connected to the curved portion 13A. The reinforcing member 16 is formed of a metal rod, and is joined to the intermediate frame 14 and the curved portion 13A by welding.

A plurality of S-shaped springs 17 extend in the fore and aft direction between the left portion 13B and the intermediate frame 14, and between the right portion 13C and the intermediate frame 14. The S-shaped springs 17 are each bent laterally in a wavy shape, and jointly support the seat cushion pad 34 forming the seat cushion S1 from below.

The seat back frame F2 includes a pair of left and right side frames 21 extending vertically, an upper frame 22 extending between the upper parts of the left and right side frames 21, and a lower frame 23 positioned below the lower ends of the left and right side frames 21, and extending laterally in parallel with the upper frame 22 so as to form a substantially rectangular frame shape. The seat back frame F2 further includes an intermediate frame 24 extending vertically between the upper frame 22 and the lower frame 23 intermediately between the left and right side frames 21. The left and right side frames 21 and the upper frame 22 are formed by bending a single pipe member having a circular cross section. The lower frame 23 and the intermediate frame 24 are each formed by a pipe member having a circular cross section. A flat plate-shaped pan frame 25 is attached to the rear sides of the side frame 21, the upper frame 22, the lower frame 23, and the intermediate frame 24.

The seat back frame F2 is rotatably connected to the rear brackets 4 at the lower ends of the left and right side frames 21. The rear ends of the left and right rear links 1 are connected to the lower parts of the left and right side frames 21 of the seat back frame F2, respectively, so as to be rotatable around an axial line extending laterally. Further, the front ends of the left and right rear links 1 are connected to the rear parts of the side frames 11 of the left and right seat cushion frames F1, respectively, so as to be rotatable around an axial line extending laterally.

As shown in FIG. 1, in a rear seating arrangement of a vehicle having a left seating part 31, a middle seating part 32 and a right seating part 33 arranged laterally in a single row, the vehicle seat S according to the present embodiment provides the left seating part 31 and the middle seating part 32. In other words, the seat cushion frame F1 forms the bottom support for the left seating part 31 and the middle seating part 32, and the seat back frame F2 forms the back support for the left seating part 31 and the middle seating part 32. The right seating part 33 is formed by a separate vehicle seat provided separately from the vehicle seat forming the left seating part 31 and the middle seating part 32.

The seat cushion S1 of the left seating part 31 and the middle seating part 32 is formed by the seat cushion pad 34, and the seat back S2 of the left seating part 31 and the middle seating part 32 is formed by the seat back pad 35. A laterally middle part of a rear edge of the seat cushion pad 34 is provided with a recessed portion 34A which is recessed forward from the rear edge. The recessed portion 34A is formed in a part corresponding to the curved portion 13A of the rear frame 13. In other words, the rear edge of the seat cushion pad 34 is formed so as to conform to the shape of the rear flame 13. Thus, a recess 36 is formed in a laterally middle part of the seat cushion S1 owing to the curved portion 13A of the rear frame 13 and the recessed portion 34A of the seat cushion pad 34. Further, the right end of the rear part of the seat cushion S1 is provided with a recess 37 which is recessed forward from the rear edge of the seat cushion S1.

In the rear frame 13 of the seat cushion frame F1, the left portion 13B forms a rear part of the left seating part 31, the right portion 13C forms a rear part of the middle seating part 32, and the curved portion 13A is located on the boundary between the left seating part 31 and the middle seating part 32. As shown in FIG. 4, the left portion 13B is disposed downward with respect to the right portion 13C, and the part of the seat cushion pad 34 located on the left portion 13B is thicker than the part thereof located on the middle seating part 32. Therefore, the sitting comfort of the left seating part 31 which is expected to be more frequently used than the middle seating part 32 can be improved. In addition, since the curved portion 13A is positioned away from a part corresponding to the lower side of the buttocks of the seat occupant, the seat occupant is prevented from experiencing any discomfort owing to the presence of the curved portion 13A.

The back side of the seat back S2 is provided with a latch 5 for detachably engaging a striker (not shown) provided on a side panel forming the side wall of the passenger compartment of the vehicle. By engaging the latch 5 with the striker, the seat back S2 is maintained in the upright position. At this time, the seat cushion S1 connected to the seat back S2 by the left and right rear links 1 is in a predetermined seating position suitable for seating corresponding to the upright position of the seat back S2. This state is referred to as the use state of the vehicle seat S. When the engagement between the latch 5 and the striker is released, the seat back S2 can be rotated in the forward direction. As the seat back S2 rotates forward, the seat cushion S1 coupled to the seat back S2 by the left and right rear links 1 moves forward and downward (see FIG. 6). The state in which the seat back S2 is folded forward so as to overlap with the upper surface of the seat cushion S1 is referred to as the folded state of the vehicle seat (see FIG. 7).

An upper part or at least a part of a buckle device 41 for the seat belt of the left seating part 31 is disposed in the recess 36 of the seat cushion S1. More specifically, the upper part of the buckle device 41 is passed through the inside of the curved portion 13A of the rear frame 13 and is disposed inside the recessed portion 34A of the seat cushion pad 34. The seat belt buckle device 42 of the middle seating part 32 and the seat belt buckle device 43 of the right seating part 33 are disposed in the recess 37 of the seat cushion S1.

Figure 8:
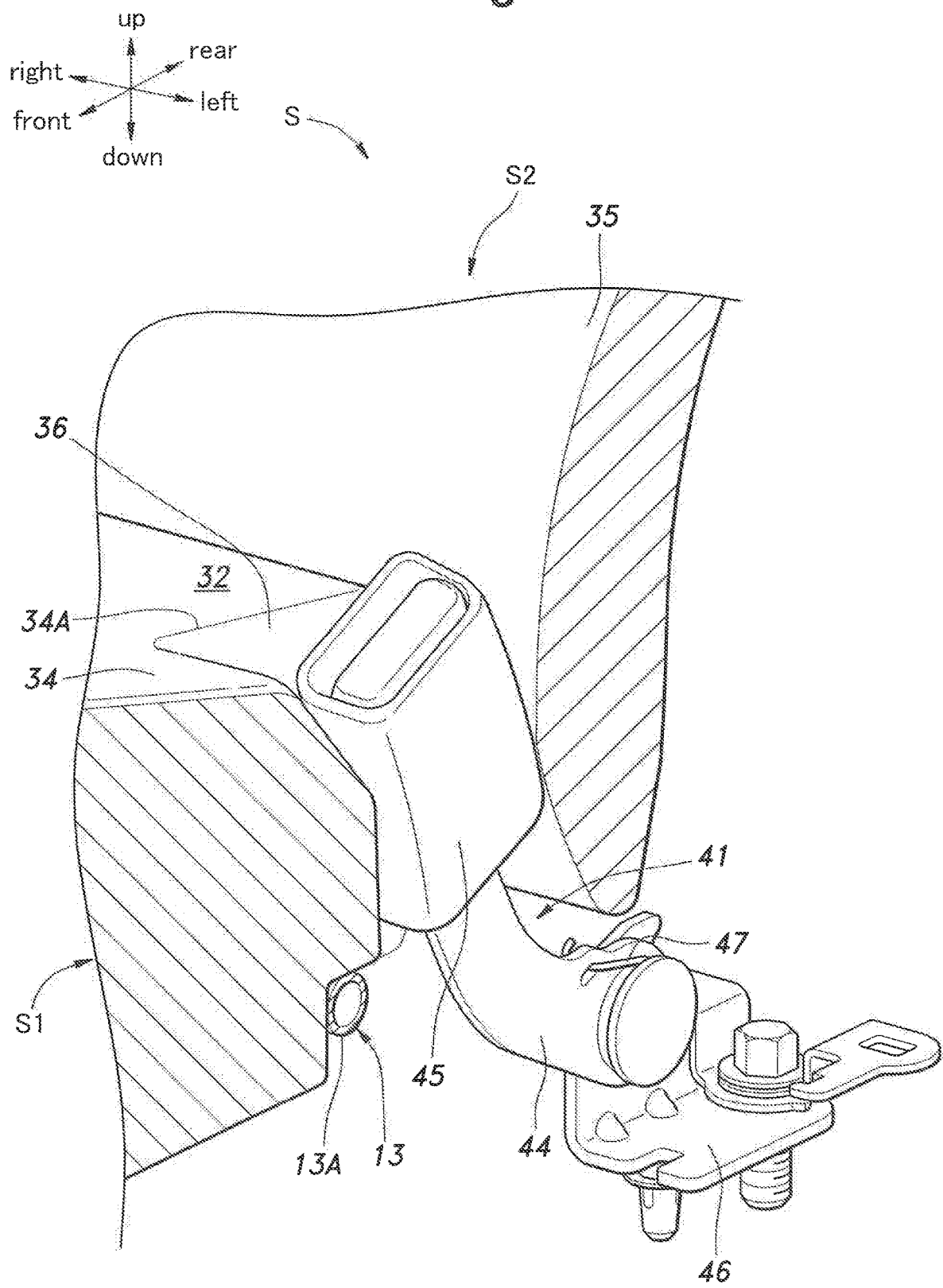
FIG. 8 is a sectional perspective view of a buckle support arm (corresponding to a cross sectional view taken along line A-A of FIG. 1)

As shown in FIG. 8, the bugle device 41 includes a buckle support arm 44 and a buckle 45 fixedly secured to the free end of the buckle support arm 44. The buckle 45 is configured to detachably engage a tongue plate of the seat belt. The base end of the buckle support arm 44 is supported by a bracket 46 which is fixedly secured to the floor FL so as to be rotatable in the fore and aft direction. As a result, the buckle support arm 44 can be rotated in the fore and aft direction between a use position where the buckle 45 is positioned above the base end of the buckle support arm 44, and a stowed position where the buckle 45 is positioned forward with respect to the use position. A biasing device 47 is provided between the bracket 46 and the buckle support arm 44. The biasing device 47 may include a torsion coil spring, for instance, that urges the buckle support arm 44 toward the use position with respect to the bracket 46.

The buckle support arm 44 is disposed in the recess 36 of the seat cushion S1. More specifically, the buckle support arm 44 passes through the inside of the curved portion 13A of the rear frame 13, and is disposed inside the recessed portion 34A of the seat cushion pad 34.

Figure 5:
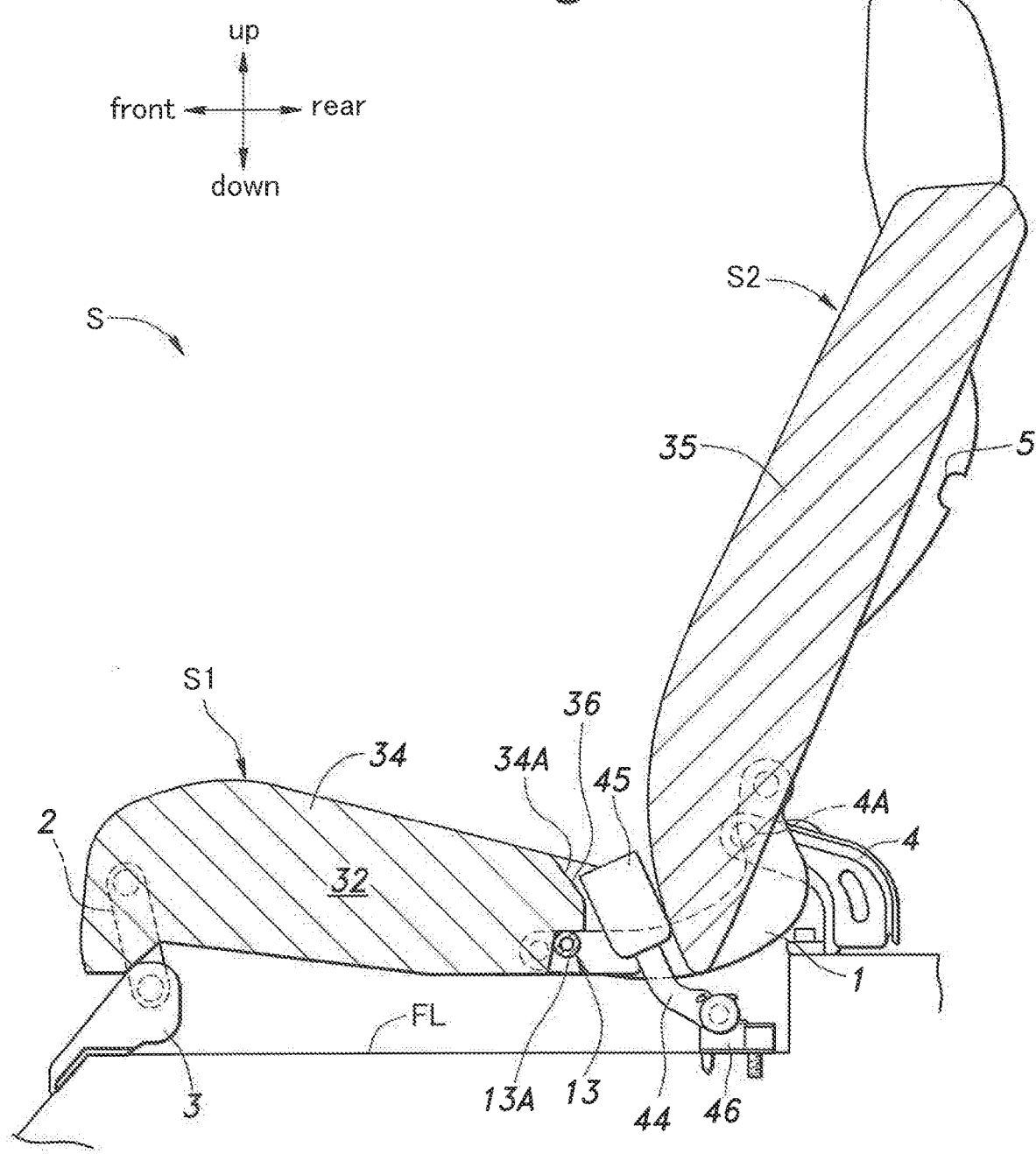
FIG. 5 is a sectional view of the vehicle seat in a use state (corresponding to a cross sectional view taken along line A-A of FIG. 1)

When the vehicle seat S is in the use state, the buckle support arm 44 is urged by the biasing device 47 to be in the use position, and at least a part of the buckle 45 is located above the upper surface of the seat cushion S1 (the seat cushion pad 34) (See FIG. 5). At this time, the buckle 45 is located in front of the lower end part of the seat back S2 and is disposed in a space defined by the recess 36 and the front surface of the seat back S2. When the vehicle seat S is in the use state, the curved portion 13A of the rear frame 13 and the seat cushion pad 34 are positioned within the rotational locus of the buckle device 41 including the buckle 45 and the buckle support arm 44 so that the buckle support arm 44 cannot be moved to the stowed position. When the vehicle seat S is in the folded state, the seat cushion S1 has moved forward from the position corresponding to the use state of the vehicle seat S. Therefore, the curved portion 13A of the rear frame 13 and the seat cushion pad 34 are not positioned in the rotational locus of the buckle device 41 including the buckle 45 and the buckle support arm 44 so that the buckle support arm 44 can move to the stowed position. When the buckle support arm 44 is in the stowed position, the buckle 45 is in a forwardly inclined state, and the upper end thereof is positioned below the upper surface of the seat cushion S1 (seat cushion pad 34) (see FIG. 7).

Figure 6:
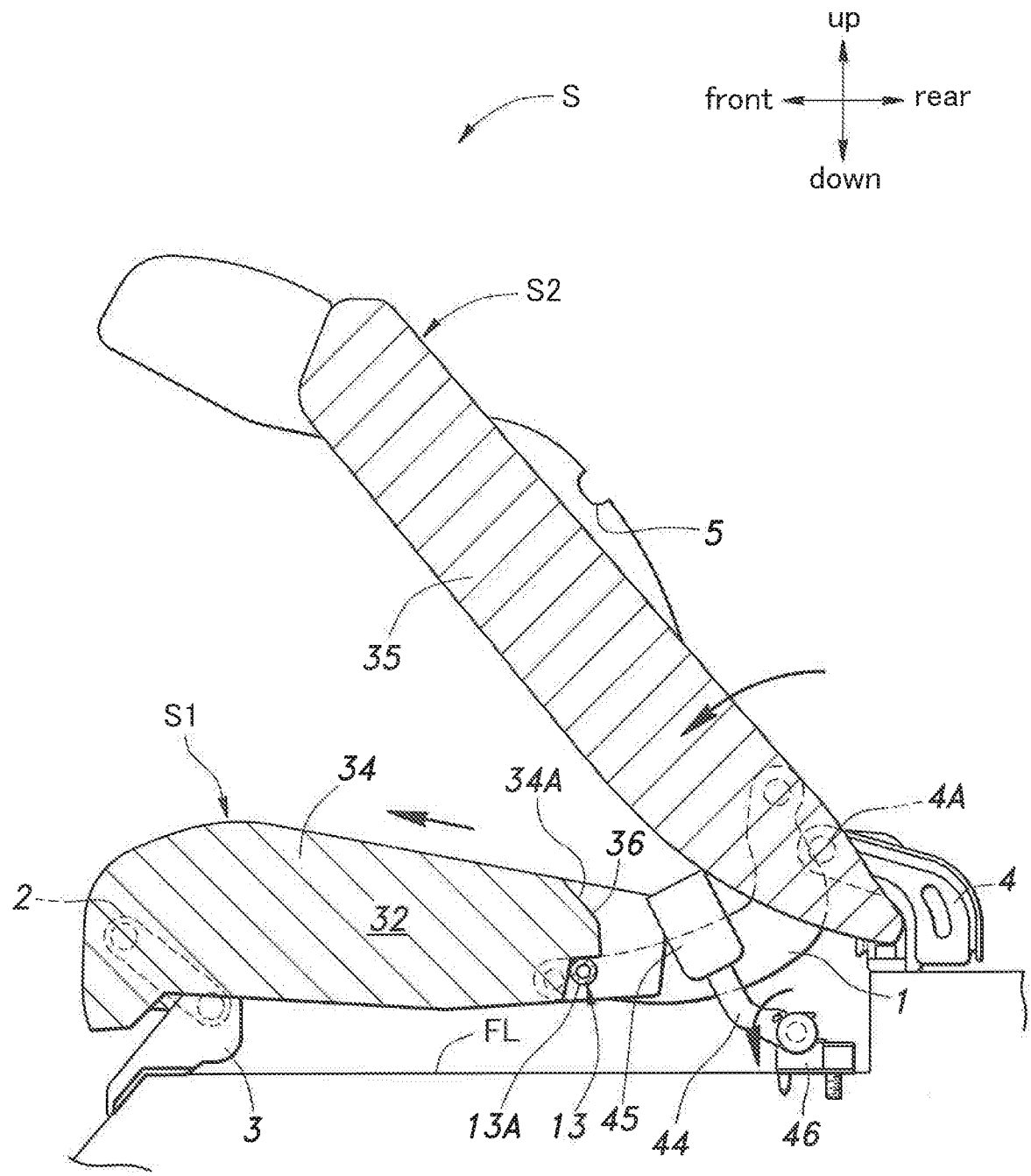
FIG. 6 is a sectional view showing the vehicle seat in an intermediate state between the use state and a folded state (corresponding to a cross sectional view taken along line A-A of FIG. 1)

When moving the vehicle seat S from the use state to the folded state, firstly, the engagement between the striker (not shown) and the latch 5 is released, and the upper side of the seat back S2 is pushed forward as shown in FIG. 6. As the seat back S2 rotates forward, the seat cushion S1 connected to the seat back S2 by the rear links 1 moves forward and downward with respect to the floor FL.

Figure 7:
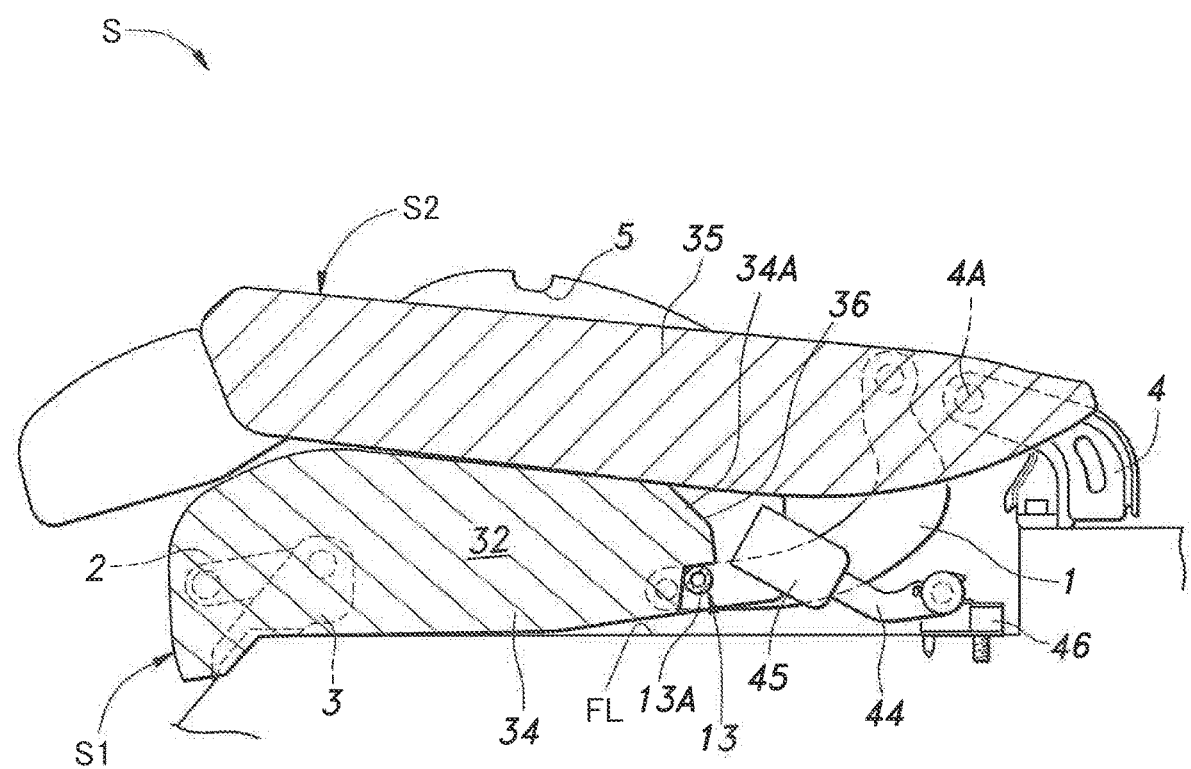
FIG. 7 is a sectional view showing the vehicle seat in the folded state (corresponding to a cross sectional view taken along line A-A of FIG. 1)

When moving the vehicle seat S from the use state to the folded state, the curved portion 13A of the rear frame 13 and the seat cushion pad 34 are displaced away from the rotational locus of the buckle device 41 as the seat cushion S1 moves forward so that the buckle support arm 44 becomes rotatable. Then, the buckle support arm 44 is pushed by the seat back S2 and rotates from the use position to the stowed position against the biasing force of the biasing device 47. As a result, the buckle 45 changes from the upright state (FIG. 5) to the forwardly tilted state (FIG. 7). As shown in FIG. 7, when the buckle 45 is in the forwardly tilted state, the upper end thereof is positioned lower than the upper surface of the seat cushion pad 34 so that the buckle 45 does not hinder the rotation of the seat back S2. Therefore, the curved portion 13A and the recessed portion 34A (36) are dimensioned so as to avoid interference with the buckle 45 when the vehicle seat S is in the folded state and the buckle support arm 44 is in the stowed position.

Further, since the buckle support arm 44 can take the stowed position only when the seat cushion S1 has moved forward, the recessed portion 34A formed in the seat cushion pad 34 can be made small so that the seat surface area of the seat cushion S1 is maximized. Further, the necessary bend of the curved portion 13A of the rear frame 13 can be minimized.

In addition, since the reinforcing member 16 extends between the curved portion 13A of the rear frame 13 of the seat cushion frame F1 and the intermediate frame 14, even though the rear frame 13 is provided with the curved portion 13A, the stiffness of the rear frame 13 can be ensured. In addition, since the rear frame reinforcing member 15 is connected to the rear frame 13, the rear frame 13 can be reinforced without interfering with the buckle support arm 44.

Second Embodiment

A vehicle seat S according to a second embodiment of the present invention is described in the following. The reinforcing member 16 extended between the curved portion 13A and the intermediate frame 14 in the first embodiment, but may also extend between the curved portion 13A and the front frame 12 as shown in FIG. 9. This arrangement provides similar advantages to those of the first embodiment where the reinforcing member 16 extends between the curved portion 13A and the intermediate frame 14. More specifically, the stiffness of the seat cushion frame F1 by virtue of the intermediate frame 14. Even when the rear frame 13 is provided with the curved portion 13A, the reinforcing member 16 is effective in ensuring the stiffness of the seat cushion frame F1.

Third Embodiment

A vehicle seat S according to a third embodiment of the present invention is described in the following. In the first embodiment, the right portion 13C was arranged at a position higher than the left portion 13B, hut as shown in FIG. 10, the left portion 13B and the right portion 13C may also be arranged at the same height while a bracket 18 is provided on the upper face of the right portion 13C so that the upper surface of the right portion 13C is in effect higher than the upper surface of the left portion 13B. This arrangement also provides advantages similar to those of the above mentioned arrangement where the right portion 13C is positioned higher than the left portion 13B. More specifically, the thickness of the seat cushion pad 34 in the left seating part 31 can be increased in view of the fact that the left seating part 31 is likely to be more frequently used than the middle seating part 32.

Although the present invention has been described in terms of specific embodiments, the present invention is not limited by such embodiments, but can be modified and substituted without departing from the spirit of the present invention. For example, in the above described embodiments, the buckle support arm 44 was configured to be rotatable to the stowed position only when the seat cushion S1 has moved forward. However, in an alternate embodiment, the vehicle seat S is configured or dimensioned so as to avoid interfering with the buckle even when the buckle support arm 44 is in the stowed position. Thereby, the buckle support arm 44 can be rotated to the stowed position even when the vehicle seat S is in the use state.

GLOSSARY OF TERMS

11: side frame
12: front frame
13: rear frame
13A: curved portion
13B: left portion
13C: right portion
14: intermediate frame
15: rear frame reinforcing member
16: reinforcing member
31: left seating part
32: middle seating part
33: right seating part
34: seat cushion pad
34A: recessed portion
36: recess
41: buckle device
44: buckle support arm
45: buckle
47: biasing device
FL: floor
F1: seat cushion frame
F2: seat back frame
S: vehicle seat
S1: seat cushion
S2: seat back

The invention claimed is:

1. A vehicle seat; comprising:
   a seat back frame attached to a floor so as to be rotatable in a fore and aft direction within a prescribed range;
   a seat cushion frame rotatably attached to the seat back frame, and configured to move forward when the seat back frame is tilted forward; and
   a buckle support arm having a base end attached to the floor so as to be rotatable in the fore and aft direction, and a free end fitted with a buckle configured to be coupled with a tongue plate of a seat belt, the buckle support arm being rotatable between a use position where the buckle is positioned above the base end of the buckle support arm, and a stowed position where the buckle is positioned more forward than in the use position;
   wherein the seat cushion frame includes a pair of side frames located on either side and extending in the fore and aft direction, a front frame extending between front parts of the side frames, and a rear frame extending between rear parts of the side frames and provided with a curved portion protruding forward in a laterally middle part thereof,
   wherein the buckle support arm is located behind the curved portion, the curved portion being dimensioned so as not to interfere with the buckle when the buckle support arm is in the stowed position, and
   wherein the vehicle seat further comprises an intermediate frame extending laterally between the side frames intermediately between the front frame and the rear frame, and a reinforcing member extending in the fore and aft direction between the curved portion and the intermediate frame.

2. The vehicle seat according to claim 1, wherein the curved portion is positioned in a rotational locus of the buckle support arm and the buckle when the seat cushion frame is positioned in a rearmost position in correspondence to a position of the seat back frame, and out of the rotational locus of the buckle support arm and the buckle when the seat cushion frame is positioned in a more forward position in correspondence to the position of the seat back frame.

3. The vehicle seat according to claim 1, further comprising a seat cushion pad supported by the seat cushion frame, and provided with a recessed portion recessed forward from a part of a rear edge of the seat cushion frame corresponding to the curved portion,
   wherein the buckle support arm is positioned in the recessed portion in such a manner that the seat cushion pad is positioned in the rotational locus of the buckle support arm and the buckle when the seat cushion frame is positioned in the rearmost position in correspondence to the position of the seat back frame, and out of the rotational locus of the buckle support arm and the buckle when the seat cushion frame is positioned in a more forward position in correspondence to the position of the seat back frame.

4. The vehicle seat according to claim 3, wherein an upper end of the buckle is lower than an upper surface of the seat cushion pad in the stowed position.

5. The vehicle seat according to claim 1, further comprising a biasing device for urging the buckle support arm toward the use position.

6. The vehicle seat according to claim 1, further comprising a reinforcing member extending in the fore and aft direction between the curved portion and the front frame.

7. The vehicle seat according to claim 1, wherein the rear frame includes a left portion and a right portion extending laterally on either side of the curved portion, and the seat cushion frame defines a pair of seating parts, the left portion forming a rear part of one of the seating parts, the right portion forming a rear part of the other of the seating parts, and the curved portion is positioned at a boundary between the two seating parts.

8. The vehicle seat according to claim 7, wherein the curved portion, the left portion, and the right portion are formed by a continuous pipe member.

9. The vehicle seat according to claim 7, wherein the left portion and the right portion are vertically offset from each other.

10. The vehicle seat according to claim 7, wherein the seat cushion frame forms two seating parts in a rear seating arrangement including a left seating part, a middle seating part, and a right seating part that are arranged laterally, the two seating parts being formed by one of the left and right seating parts, and the middle seating part, and one of the left portion and the right portion corresponding to the left seating part or the right seating part is offset downward relative to the other of the left portion and the tight portion corresponding to the middle seating part.

11. The vehicle seat according to claim 7, further comprising a rear frame reinforcing member connected to the left portion and the right portion, and curved and/or bent downward in a part thereof corresponding to the curved portion.

12. The vehicle seat according to claim 1, wherein the curved portion has a V shaped configuration projecting forward in plan view.

* * * * *